Nov. 8, 1960
M. MARK
2,959,165
COLLAPSIBLE BARBECUE UNIT
Filed April 21, 1958
2 Sheets-Sheet 1
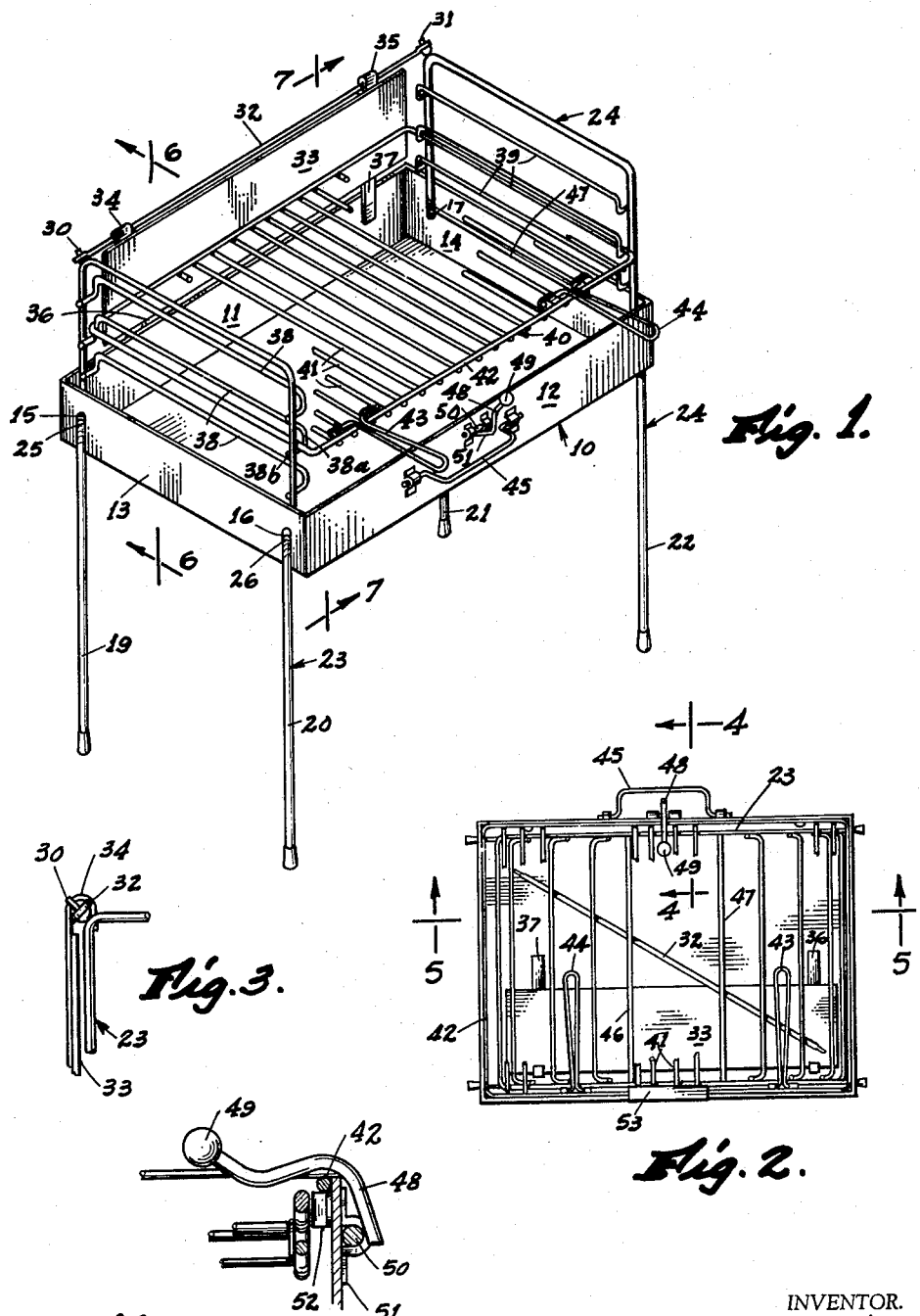
INVENTOR.
MORRIS MARK
BY Robert C. Comstock
ATTORNEY Nov. 8, 1960 M. MARK 2,959,165
COLLAPSIBLE BARBECUE UNIT
Filed April 21, 1958 2 Sheets-Sheet 2

INVENTOR.
MORRIS MARK
BY Robert C. Comstock
ATTORNEY

United States Patent Office 2,959,165
Patented Nov. 8, 1960

2,959,165

COLLAPSIBLE BARBECUE UNIT

Morris Mark, Los Angeles, Calif.
(1705 W. 134th St., Gardena, Calif.)

Filed Apr. 21, 1958, Ser. No. 729,875

5 Claims. (Cl. 126—9)

This invention relates to a collapsible barbecue unit.

It is an object of my invention to provide a new and improved collapsible barbecue unit which is portable and which is particularly adapted for use by campers and travelers as well as for use by the ordinary home owner.

It is particularly an object of my invention to provide a collapsible barbecue unit which when assembled is rigid and sturdy in construction and complete and efficient in operation. When collapsed, my unit folds into a compact size comparable to a small suitcase and provides its own locking means and carrying handle.

It is a further object of my invention to provide such a device which is simple and economical to manufacture and which is simple for the user to assemble and disassemble.

Another object of my invention is to provide a device of the class described in which the number of parts is minimized and in which the major parts are not completely separated from each other when the unit is disassembled to order to simplify and expedite re-assembly of the unit.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is an isometric view of my barbecue unit assembled and ready for use as a barbecue. In order to clarify the illustration, some of the rods on the rack have been shown only in part or omitted.

Fig. 2 is a top plan view of my barbecue unit in collapsed condition. In order to clarify the illustration, some of the rods on the rack have been shown only in part or omitted.

Fig. 3 is a sectional view of one corner taken on line 3—3 of Fig. 6.

Fig. 4 is a sectional view of the latch assembly taken on line 4—4 of Fig. 2.

Figure 5:
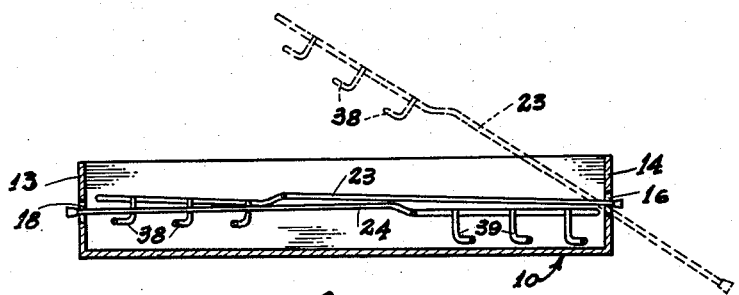
Fig. 5 is a sectional view of the bed and rack members only taken on line 5—5 of Fig. 2, with one of the rack members shown in dotted lines as it is being moved from storage position to use position.
Figure 6:
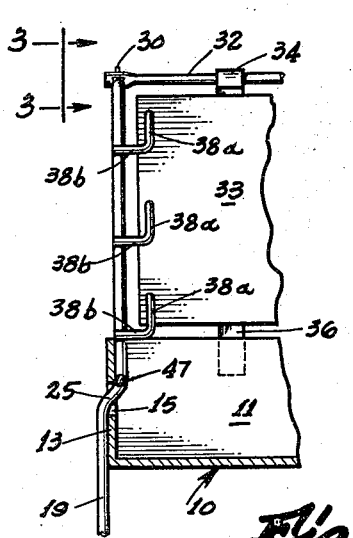
Fig. 6 is a sectional view of one end taken on line 6—6 of Fig. 1.
Figure 7:
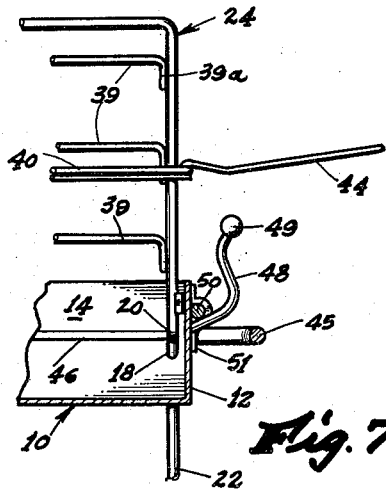
Fig. 7 is a sectional view of the front center taken on line 7—7 of Fig. 1.

A preferred embodiment which has been selected to illustrate my invention comprises an oblong rectangular bed 10, which is preferably formed of sheet metal. The bed 10 has a flat bottom which is surrounded by vertical sides in the form of a back panel 11, front panel 12 and side panels 13 and 14, which extend upwardly at a right angle from the bottom of the bed 10. When my unit is in use, the bed 10 holds the coals, wood or other heating material. When my unit is not in use, the bed 10 provides a storage area to hold the other component parts of my unit.

The side panels 13 and 14 are provided at their opposite ends with elongated slots 15 and 16, and 17 and 18, respectively. Extending through these slots are the legs 19 and 20, and 21 and 22, respectively, of a pair of inverted U-shaped rack members 23 and 24. These legs are preferably provided on their bottom ends with suitable tips.

When my unit is in collapsed position, as shown in Fig. 5 of the drawings, only the ends of the legs protrude through the slots, with the rack members 23 and 24 being disposed in overlying relationship to each other within the bed 10.

When my unit is moved to assembled position, the rack members 23 and 24 are lifted out of the bed 10 and their legs moved through the slots 15—18. The legs 19—22 are provided adjacent their upper ends with bent portions 25—28. The legs 19—22 are moved until these bent portions 25—28 pass through the slots 15—18. The rack members 23 and 24 are then moved into a right angular or vertically upright position with respect to the bed 10, in which position the portions of the side panels 13 and 14 directly above the slots 15—18 bear down upon and are supported by the bent portions 25—28 to hold the bed 10 in the elevated position shown in Fig. 1 of the drawings.

In order to hold the rack members 23 and 24 securely in such position, the upper rear corners of the rack members 23 and 24 are provided with pins 30 and 31 respectively which extend upwardly and rearwardly with respect to the assembled unit.

An elongated metal bar 32 has flattened ends provided with openings which fit around and receive the pins 30 and 31. The distance between the openings at the ends of the bar 32 is preferably slightly greater than the distance between the pins 30 and 31. It is accordingly necessary to stretch the upper ends of the rack members 23 and 24 slightly apart from each other in order to fit the pins 30 and 31 into the openings in the bar 32. This places the bar 32 under tension and causes the pins 30 and 31 to bear against the inner sides of the openings. This tension and frictional engagement act to prevent the pins 30 and 31 from slipping out of the openings.

A back shield 33 is preferably formed of sheet metal and is adapted to enclose the area between the bar 32, the top of the back panel 11 and the rack members 23 and 24. The back shield 33 is provided at the top and opposite ends thereof with a pair of U-shaped hooks 34 and 35, which are adapted to slidably fit over the bar 32. The bottom of the back shield 33 is provided at the ends thereof with a pair of downwardly directed locking members 36 and 37. The locking members 36 and 37 are preferably disposed so that one fits inside of the back panel 11 and the other fits outside of the back panel 11.

This arrangement locks the back shield 33 in position, as shown in Fig. 1 of the drawings.

The rack members 23 and 24 are each provided with three spaced parallel rack supports 38 and 39 respectively. Each of the rack supports has a horizontally extending straight portion which is spaced inwardly from the rack member by right angular downwardly directed portions 38a and 39a respectively and right angular horizontally directed portions 38b and 39b, the ends of which are secured to the sides of the rack members 23 and 24 adjacent the upper ends thereof.

A rack 40 is adapted to be removably mounted on the rack supports 38 and 39. The rack 40 is formed of metal and comprises a plurality of parallel rods 41 which extend between the opposite longer sides of an oblong rectangular outer frame 42. The frame 42 is dimensioned so that it will fit upon the rack supports 38 and 39. The opposite ends of the frame 42 rest upon the horizontally directed portions 38b and 39b and are disposed beneath the straight portions of the rack supports between such straight portions and the upper side portions of the rack members 23 and 24.

The rack supports 38 and 39 thus simultaneously support the rack 40 and also interlock with its frame 42 in order to prevent any horizontal displacement of the rack 40. The rack 40 can be placed upon the rack supports 38 and 39 and removed therefrom only in a vertical direction.

The rack 40 is provided at its front edge with a pair of handles 43 and 44. Each of the handles comprises a single piece of wire which is bent to form an elongated portion which is adapted to protrude outwardly from the rack 40 as shown in Fig. 1 of the drawings. The inner ends of the handles 43 and 44 are bent outwardly at a right angle to provide pivot portions which are rotatably mounted beneath brackets which are secured to the tops of the rods 41 of the rack 40. The handles 43 and 44 are thus adapted to be pivoted to an inward position in which they extend parallel to the rods 41.

The front panel 12 is provided at the center thereof with a pivotally mounted handle 45 which is adapted to lie flat against the front panel 12 or to be pivoted outwardly therefrom for use in carrying the unit when it is in collapsed condition.

The rack members 23 and 24 are provided with cross bars 46 and 47, the ends of which are secured to their legs 19—22 directly above the bent portions 25—28. The cross bars 46 and 47 extend between the legs and act as stop members to limit the outward movement of the legs 19—22 through the slots 15—18. The cross bars 46 and 47 also act as pivots while the rack members 23 and 24 are moved from horizontal to vertical position. When the unit is in assembled position, the cross bars 46 and 47 are disposed adjacent the side panels 13 and 14.

When my unit is in collapsed or carrying condition, the rack members 23 and 24 overlie each other within the bed 10, extending substantially parallel to and lying upon the bottom of the bed 10. The rack supports of one of the rack members extend between the sides of the other rack member. The handles 43 and 44 of the rack 40 are turned to their inwardly directed positions and are disposed beneath the rack 40. A pair of small supporting brackets 52 extend inwardly from the front panel 12 and act to support the front edge of the frame 42 of the rack 40. The opposite side of the frame 42 fits beneath a flange 53 which extends inwardly from the top edge of the back panel 11.

A latch 48 is mounted on the front panel 12 adjacent the top thereof. The latch 48 is bent angularly to form a hook and terminates at its upper end in a knob 49. The lower end of the latch 48 is secured to a pivot rod 50, which is rotatably mounted in a pair of brackets 51 which are secured to the front panel 12. The resilience of the rack members 23 and 24 overlying each other exerts upward pressure on the rack 40, causing the front edge of the frame 42 to be forced upwardly within the hooked portion of the latch 48. This provides frictional engagement between the frame 42 and the latch 48 which increases as the latch 48 is moved toward open position in order to prevent accidental unlatching.

Figure 9:
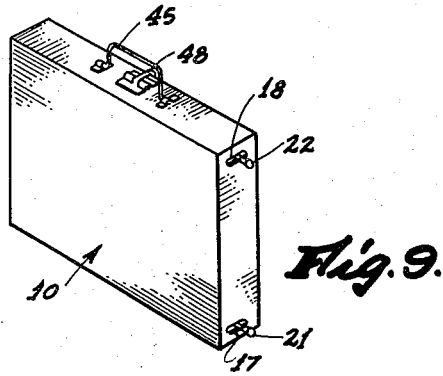
Fig. 9 is a perspective view of my barbecue unit in collapsed condition and ready for carrying.

When my barbecue unit is completely collapsed it takes the form of a small suitcase, as shown in Fig. 9 of the drawings, and has its own latch, carrying case and handle. When in barbecue position, it provides a complete barbecue unit, with the rack 40 being selectively movable to any of three heights above the bed 10 and with the parts being interlocked to provide an extremely sturdy self-supporting construction.

Figure 8:
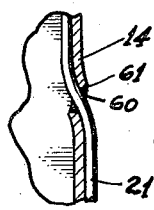
Fig. 8 is an enlarged fragmentary sectional view of an alternative construction.

Instead of providing the slots 15—18 in the side panels, I may provide an alternative construction which is shown in Fig. 8 of the drawings. In this embodiment, I substitute for the slots a hole 60, with the portions of the panel 14 on each side of the hole being bent or deformed in opposite directions as shown at 61, so that the bent portions of the rack members can pass through the hole 60 in the same manner as if they were passing through a slot.

I claim:

1. A collapsible barbecue unit comprising a bed having an oblong rectangular bottom, and front, back and side panels extending upwardly at a right angle from said bottom to provide an enclosed area adapted to hold heating material when said barbecue unit is arranged for use and to hold the component parts of said barbecue unit when said unit is arranged for carrying, each of said side panels having a pair of elongated slots, a pair of rack members, each of said rack members having a pair of legs, said rack members being disposed in overlying relationship to each other on the bottom of said bed when said unit is arranged for carrying, with the ends of said legs extending through the slots in said side panels, each of said legs having a bent portion formed therein, each of said rack members having a cross bar extending between the legs thereof directly above said bent portions, said legs being slidable through said slots so that said bent portions extend through said slots when said unit is arranged for use, said cross bars engaging said side panels to limit the movement of said legs through said slots and to act as pivots for the movement of said rack members to vertically upright position, said side panels engaging said bent portions and being supported by said legs, each of said rack members having a plurality of spaced parallel rack supports adjacent the upper end thereof, each of said rack supports extending inwardly and then upwardly from said rack member to provide a horizontally directed channel between said rack support and said rack member when said rack members are disposed in upright position, each of said rack members having a pin projecting from the upper rear corner thereof when said rack members are disposed in upright position, a bar having an opening at each end thereof, said openings adapted to removably receive said pins when said bar is disposed between said rack members, a back shield removably supported at the upper end thereof by said bar, said back shield enclosing the area between the upper end of said back panel, said bar and said rack members, said back shield having a pair of downwardly directed locking members adapted to engage said back panel to hold said back shield in position, a rack having an oblong rectangular frame with a plurality of spaced parallel rods extending thereacross, the ends of said frame being adapted to fit within said channels and be supported by a pair of said rack supports when said barbecue unit is arranged for use, said rack being selectively movable to any pair of said rack supports, a pair of handles pivotally connected to one of the longer sides of said rack, said handles adapted to selectively overlie said rack or extend outwardly therefrom, said rack members, back shield and bar adapted to be disposed within said bed in overlying relationship to each other when said barbecue unit is arranged for carrying, with said rack disposed on top of said members, a hook-shaped latch carried by one of said panels, said latch being adapted to overlie and engage one edge of the frame of said rack to hold said rack and retain said members within said bed and a handle carried by one of said panels for carrying said barbecue unit.

2. A collapsible barbecue unit comprising a bed having an oblong rectangular bottom, and front, back and side panels extending upwardly at a right angle from said bottom to provide an enclosed area adapted to hold heating material when said barbecue unit is arranged for use and to hold the component parts of said barbecue unit when said unit is arranged for carrying, each of said side panels having a pair of openings, a pair of rack members, each of said rack members having a pair of legs, said rack members being disposed in overlying relationship to each other on the bottom of said bed when said unit is arranged for carrying, with the ends of said legs extending through the openings in said side panels, each of said legs having a bent portion formed therein, each of said rack members having a cross bar extending between the legs thereof directly above said bent portions, said legs being slidable through said openings so that said bent portions extend through said openings when said unit is arranged for use, said cross bars engaging said side panels to limit the movement of said legs through said openings and to act as pivots for the movement of said rack members to vertically upright postions, said side panels engaging said bent portions and being supported by said legs, each of said rack members having a plurality of spaced parallel rack supports adjacent the upper end thereof, a bar extending between and removably secured to the upper rear corners of said rack members when said rack members are disposed in upright position, a back shield removably supported at the upper end thereof by said bar, said back shield enclosing the area between the upper end of said back panel, said bar and said rack members, a rack having an oblong rectangular frame with a plurality of spaced parallel rods extending thereacross, the ends of said frame adapted to be supported by said rack supports when said barbecue unit is arranged for use, said rack being selectively movable to any pair of said rack supports, a pair of handles pivotally connected to one of the longer sides of said rack, said handles adapted to selectively overlie said rack or extend outwardly therefrom, said rack members, back shield and bar adapted to be disposed within said bed in overlying relationship to each other when said barbecue unit is arranged for carrying, with said rack disposed on top of said members, a hook-shaped latch carried by one of said panels, said latch being adapted to overlie and engage one edge of the frame of said rack to hold said rack and retain said members within said bed and a handle carried by one of said panels for carrying said barbecue unit.

3. A collapsible barbecue unit comprising a bed having an oblong rectangular bottom, and front, back and side panels extending upwardly at a right angle from said bottom to provide an enclosed area adapted to hold heating material when said barbecue unit is arranged for use and to hold the component parts of said barbecue unit when said unit is arranged for carrying, each of said side panels having a pair of openings, a pair of rack members, each of said rack members having a pair of legs, said rack members being disposed in overlying relationship to each other within said bed when said unit is arranged for carrying, with the ends of said legs extending through the openings in said side panels, each of said legs having a bent portion, each of said rack members having a cross bar extending between the legs thereof directly above said bent portions, said legs being slidable through said openings so that said bent portions extend through said openings when said unit is arranged for use, said cross bars engaging said side panels to limit the movement of said legs through said openings and to act as pivots for the movement of said rack members to vertically upright position, said side panels engaging said bent portions and being supported by said legs, each of said rack members having a plurality of rack supports adjacent the upper end thereof, a bar extending between and removably secured to the upper rear corners of said rack members when said rack members are disposed in upright position, a rack having an oblong rectangular frame with a plurality of spaced parallel rods extending thereacross, the ends of said frame adapted to be supported by said rack supports when said barbecue unit is arranged for use, a pair of handles pivotally connected to one of the longer sides of said rack, said handles adapted to selectively overlie said rack or extend outwardly therefrom, said rack adapted to be disposed within said bed in overlying relationship to said rack members when said barbecue unit is arranged for carrying, latch means carried by one of said panels, said latch means being adapted to hold said rack and retain said members within said bed and handle means for carrying said barbecue unit.

4. A collapsible barbecue unit comprising a bed having a bottom, and front, back and side panels extending upwardly from said bottom to provide an enclosed area adapted to hold heating material when said barbecue unit is arranged for use and to hold the component parts of said barbecue unit when said unit is arranged for carrying, each of said side panels having a pair of openings, a pair of rack members, each of said rack members having a pair of legs, said rack members being disposed in overlying relationship to each other on the bottom of said bed when said unit is arranged for carrying, with the ends of said legs extending through the openings in said side panels, each of said legs having a bent portion, each of said rack members having a cross bar extending between the legs thereof directly above said bent portions, said legs being slidable through said openings so that said bent portions extend through said openings when said unit is arranged for use, said cross bars engaging said side panels to limit the movement of said legs through said openings and to act as pivots for the movement of said rack members to vertically upright position, said side panels engaging said bent portions and being supported by said legs, each of said rack members having at least one rack support adjacent the upper end thereof, retaining means extending between and removably secured to said rack members when said rack members are disposed in upright position, a rack having a plurality of spaced rods extending thereacross, said rack adapted to be supported by said rack supports when said barbecue unit is arranged for use, said rack members adapted to be disposed beneath said rack when said barbecue unit is arranged for carrying, and latch means to retain said members within said bed and handle means for carrying said barbecue unit.

5. In a collapsible barbecue unit, a bed having a bottom, and side panels extending upwardly from said bottom to provide an enclosed area adapted to hold heating material when said barbecue unit is arranged for use and to hold the component parts of said barbecue unit when said unit is arranged for carrying, each of said side panels having a pair of openings, a pair of rack members, each of said rack members having a pair of legs, said rack members being disposed in overlying relationship to each other within said bed when said unit is arranged for carrying, with the ends of said legs extending through the openings in said side panels, each of said legs having a bent portion, each of said rack members having a cross bar extending between the legs thereof directly above said bent portions, said legs being slidable through said openings so that said bent portions extend through said openings when said unit is arranged for use, said cross bars engaging said side panels to limit the movement of said legs through said openings and to act as pivots for the movement of said rack members to vertically upright position, said side panels engaging said bent portions and being supported by said legs, each of said rack members having at least one rack support adjacent the upper end thereof, retaining means extending between and removably secured to said rack members when said rack members are disposed in upright position, and a rack having a plurality of spaced rods extending thereacross, said rack adapted to be supported by said rack supports when said barbecue unit is arranged for use.

References Cited in the file of this patent

UNITED STATES PATENTS

| | | |
|---|---|---|
| 823,699 | Roemer | June 19, 1906 |
| 1,467,815 | Roemer | Sept. 11, 1923 |
| 1,472,178 | Klein | Oct. 30, 1923 |
| 1,476,542 | Rasmussen | Dec. 4, 1923 |
| 1,540,434 | Stone | June 2, 1925 |
| 1,964,805 | Barnes | July 3, 1934 |
| 2,158,805 | Smith | May 16, 1939 |
| 2,469,698 | Morgan | May 10, 1949 |
| 2,477,529 | Sprinkle et al. | July 26, 1949 |
| 2,487,605 | Smith | Nov. 8, 1949 |
| 2,631,579 | Metzger | Mar. 17, 1953 |
| 2,780,215 | Vacanti | Feb. 7, 1957 |
| 2,839,043 | LaBorn | June 17, 1958 |